United States Patent
Yamazaki et al.

(10) Patent No.: US 6,889,890 B2
(45) Date of Patent: May 10, 2005

(54) BRAZING-FILLER MATERIAL AND METHOD FOR BRAZING DIAMOND

(75) Inventors: Takahisa Yamazaki, Ibaraki (JP); Akio Suzumura, Tokyo (JP)

(73) Assignee: Hohoemi Brains, Inc., Tokyo (JP)

( * ) Notice: Subject to any disclaimer, the term of this patent is extended or adjusted under 35 U.S.C. 154(b) by 85 days.

(21) Appl. No.: 10/262,741

(22) Filed: Oct. 2, 2002

(65) Prior Publication Data

US 2003/0080177 A1 May 1, 2003

(30) Foreign Application Priority Data

Oct. 9, 2001  (JP) .................................... 2001-310937

(51) Int. Cl.[7] ...................... B23K 31/02; B23K 28/00; B23K 35/12
(52) U.S. Cl. .................. 228/124.5; 228/200; 228/253
(58) Field of Search .................... 228/122.1, 124.5, 228/200, 245, 253; 420/495, 497, 502, 503, 507, 511, 587

(56) References Cited

U.S. PATENT DOCUMENTS

| | | | | |
|---|---|---|---|---|
| 3,691,607 A | * | 9/1972 | Bondley ................... 428/661 |
| 4,009,027 A | * | 2/1977 | Naidich et al. ............. 420/473 |
| 4,580,714 A | | 4/1986 | Mayer et al. |
| 4,670,025 A | * | 6/1987 | Pipkin ......................... 51/295 |
| 4,684,579 A | * | 8/1987 | Mizuhara .................... 428/606 |
| 4,729,504 A | * | 3/1988 | Edamura ................. 228/122.1 |
| 4,749,594 A | * | 6/1988 | Malikowski et al. ....... 427/190 |
| 5,055,361 A | * | 10/1991 | Dunn et al. ................. 428/633 |
| 5,239,746 A | * | 8/1993 | Goldman ..................... 29/840 |
| 5,523,158 A | * | 6/1996 | Kapoor et al. .............. 428/408 |
| 5,523,159 A | * | 6/1996 | Kapoor et al. .............. 428/408 |
| 5,547,121 A | * | 8/1996 | Kapoor et al. .............. 228/121 |
| 5,645,937 A | | 7/1997 | Noda et al. |
| 5,855,314 A | * | 1/1999 | Shiue et al. ............. 228/124.5 |
| 6,054,693 A | * | 4/2000 | Barmatz et al. ............ 219/678 |
| 6,102,024 A | * | 8/2000 | Buljan et al. ................. 125/21 |
| 6,575,353 B2 | * | 6/2003 | Palmgren .................... 228/245 |

FOREIGN PATENT DOCUMENTS

| | | |
|---|---|---|
| DE | 24 57 198 | 6/1976 |
| WO | WO 94/03305 | 2/1994 |
| WO | WO 97/05757 | 2/1997 |

OTHER PUBLICATIONS

Patent Abstracts of Japan, vol. 0103, Jun. 11, 1986.
Hosking F M et al., Aug. 8, 2000, Microstructural and Mechanical Characterization of Actively Brazed Aluminatensile Specimens, Welding Journal, American Welding Society.

* cited by examiner

*Primary Examiner*—Stanley S. Silverman
*Assistant Examiner*—Colleen P. Cooke
(74) *Attorney, Agent, or Firm*—McGlew and Tuttle, P.C.

(57) ABSTRACT

When a diamond is brazed to a metal substrate, while obtaining a stable joining strength, a joined interface of the diamond is not eroded to provide a good joint with a beautiful view. A brazing-filler material containing at least one selected from a group consisting of gold and silver, and copper as principal components, and further containing 0.001 to 5 mass % of vanadium is used. Preferably, a vanadium content is not more than 2.0 mass %, and more preferably not more than 0.5 mass %. Using this brazing-filler material, unidirectional solidification is performed from a side of diamond to form vanadium carbide in a joined interface in a shape of islands, and thereby an interface having a beautiful view with stable joining strength can be obtained. In addition, strong joining is possible also by a usual solidification method.

25 Claims, 3 Drawing Sheets

BRAZING-FILLER MATERIAL AND METHOD FOR BRAZING DIAMOND

BACKGROUND OF THE INVENTION

1. Field of the Invention

The present invention relates to a brazing-filler material for joining a diamond and a metal and to a brazing method using the brazing-filler material.

2. Description of the Related Art

In diamond accessories, diamond tools, ceramic tools, etc., in plenty of cases, diamonds or ceramics are used being joined to substrates currently made of metal, such as plinth and shank. A silver-copper eutectic brazing-filler material containing titanium is used for the joining. The silver-copper eutectic brazing-filler material containing titanium is called TiCuSil, and titanium foil disperses to form fragment in a shape of flakes in an alloy having a eutectic composition of silver-copper. Diamonds or ceramics brazed to a substrate by the silver-copper eutectic brazing-filler material have a higher strength as compared with those joined by adhesives etc.

In diamonds bonded to a metal substrate using TiCuSil brazing-filler material, it is known that brazed interfaces of the diamonds provide black coloring. Since the brazed interface showing black can be observed through upper surface of the diamond, the TiCuSil material is not preferable for accessories. However, most coloring has been ignored in the case where ceramics had been joined by TiCuSil.

When a diamond is joined by TiCuSil, titanium in the brazing-filler material reacts with carbon in the diamond to form titanium carbide, and the titanium carbide existing between the diamond and the brazing-filler material bonds the diamond with the brazing-filler material. It became clear that, when titanium carbide is formed, irregularity is caused on the diamond surface, and thereby light was scattered on it, and the joined interface of the diamond provided black coloring.

And, the TiCuSil brazing-filler material is widely used also in manufacturing diamond tools, and it is known that the brazing-filler material occasionally provides a low joining strength. When metal works are processed using a tool having low joining strength, diamonds are sometimes removed from the tool to give contact between metal works and a shank, and both of the product and the tool might receive damage. Even if a low joining strength happens to be formed between diamonds and shanks, the defect has been considered to be caused by unskilled brazing technique without sufficient pursuit of cause.

SUMMARY OF THE INVENTION

Then, a first object of the present invention is to provide a brazing-filler material that provides stable joining strength when a diamond is brazed to a metal substrate, and a method for brazing with the brazing-filler material.

And, another object of the present invention is to provide a brazing-filler material that is suitable for joining of a diamond for ornament, and that does not provide black coloring in a joined interface, and a method for brazing with the brazing-filler material.

As a result of the research performed by the present inventors for a brazing-filler material suitable for joining of a diamond and for a preferable joined interface, based on theoretical analysis of joined interface at the time of brazing, the present invention has been accomplished.

A brazing-filler material of the present invention is a brazing-filler material containing at least one selected from a group consisting of gold and silver, and copper as principal components, and further containing 0.001 to 5 mass % of vanadium. Preferably it contains 0.001 to 2.0 mass % of vanadium. More preferably it contains 0.001 to 0.5 mass % of vanadium.

In a brazing-filler material of the present invention, a vanadium content is most preferably not less than 0.001 mass % and not more than 0.5 mass % in order to braze diamonds onto a metal substrate. When vanadium content exceeds 0.5 mass %, vanadium that remains without being melted may be observed in the joined interface as small particles. However, in not more than 2.0 mass %, as long as observed macroscopically, a degree of providing black coloring is not significant. Although joining of diamond is possible when an amount of vanadium exceeds 2.0 mass %, such an amount is not required. When a vanadium content exceeds 2.0 mass %, excessive vanadium is discharged and the brazing-filler material may lose its metallic luster in the joined interface. Considering that vanadium tends to segregate in the brazing-filler material, up to 5 mass % of vanadium may be contained when beautiful view is not considered as important.

In a brazing-filler material of the present invention, at least one selected from a group consisting of gold and silver, and copper are preferably contained in a eutectic composition.

In a brazing-filler material of the present invention, vanadium hydride may be used as vanadium, and moreover a brazing-filler material is used in which vanadium hydride containing 0.001 to 2.0 mass % of vanadium to the whole brazing-filler material is put between brazing-filler material plates that contain at least one selected from a group consisting of gold and silver, and copper as principal components or ingredients. The brazing-filler material preferably contains 0.001 to 0.5 mass % of vanadium. When using vanadium hydride as vanadium, since vanadium is uniformly distributed in the brazing-filler material, an amount of vanadium is set as at most 2.0 mass %.

In a method for brazing a diamond by the present invention, a brazing-filler material containing at least one selected from a group consisting of gold and silver, and copper as principal components, and containing 0.001 to 5 mass % of vanadium is placed on a metal substrate to be joined with, and the diamond is placed thereon, and subsequently, after the brazing-filler material is heated and melted, it is cooled and thus the brazing-filler material is solidified between the diamond and the metal substrate. In the method, as the brazing-filler material, brazing-filler material plates may be used in which vanadium hydride containing 0.001 to 2.0 mass % of vanadium to the whole brazing material is put between the brazing-filler material plates that contain at least one selected from a group consisting of gold and silver, and copper as principal components. And it is preferable that an amount of vanadium contained in the brazing-filler material is 0.001 to 0.5 mass %. A heating temperature of a brazing-filler material on brazing is preferably 10K (Kelvin) or more above a melting point of the brazing-filler material. In addition, in the method for brazing a diamond according to the present invention, after a brazing-filler material is heated and melted, it is preferable that cooling is performed from a side of the diamond to solidify the brazing-filler material. That is, it is preferable that unidirectional solidification of the brazing-filler material is carried out from a side of the diamond.

When a diamond is brazed according to the present invention, vanadium carbides are formed in a joined interface between the diamond and the brazing-filler material in a shape of minute islands. The island-like vanadium carbides are firmly joined with the diamond, and the diamond is joined with the brazing-filler material. Since a surface of the diamond is not eroded and large irregularity is not formed on the surface, an interface having a beautiful view may be obtained.

DETAILED DESCRIPTION OF THE PREFERRED EMBODIMENTS

Figure 1:
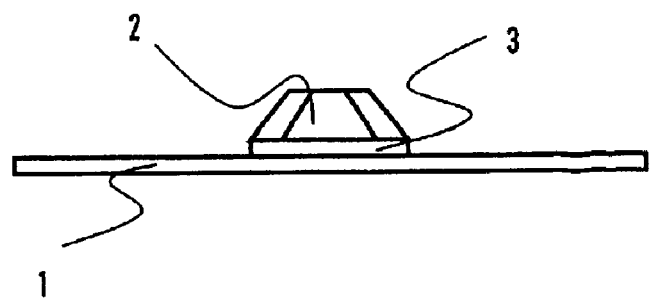
FIG. 1 is a side view in which a diamond is brazed to a metal substrate using a brazing-filler material according to the present invention.

FIG. 1 shows a side view in which a diamond is brazed on a metal substrate using a brazing-filler material according to the present invention. Reference numeral 1 represents a metal substrate, 2 represents a diamond joined, and 3 represents a brazing-filler material, in the figure. In the brazing-filler material 3, 0.001 to 5 mass %, preferably not more than 2.0 mass % of vanadium is contained in a silver-copper eutectic brazing-filler material. When the diamond is brazed on the metal substrate using a brazing-filler material, in a joined interface between the brazing-filler material and the diamond, carbon in the diamond reacts with vanadium in the brazing-filler material to form a reaction product, for example, vanadium carbides (VC). It became clear that a misfit of vanadium carbide with crystal lattice of, for example, plane (111) of the diamond was very small. A small misfit with crystal lattices provides strong linkage between them.

A crystal lattice misfit η is used to describe a growth of a thin film, and it is represented by following equation.

$$\eta = \frac{\sigma_{ff}}{\sigma_{ss}} - 1$$

Here, σss represents an interatomic distance in a diamond as a substrate, and σff represents an interatomic distance in a deposited film. A crystal lattice misfit η in case of vanadium carbide is shown in TABLE 1 together with those in titanium carbide and zirconium carbide.

TABLE 1

| Carbide | η |
|---|---|
| VC | 0.1607 |
| TiC | 0.2125 |
| ZrC | 0.3141 |

As is clear in TABLE 1, the crystal lattice misfit of vanadium carbide is smallest in them, and it is expected that the misfit of vanadium carbide will increase a joining strength with diamond.

Figure 2:
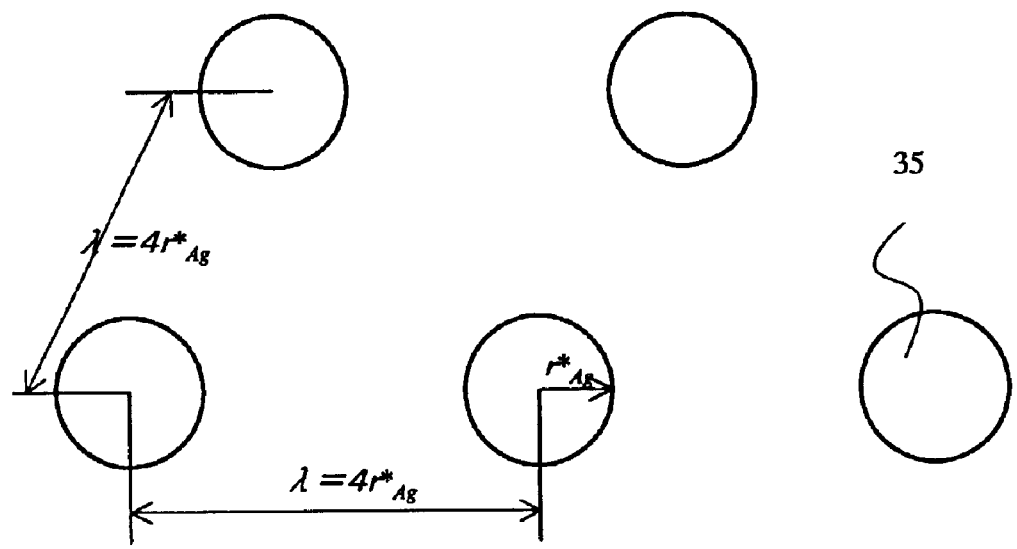
FIG. 2 is a plan view showing a model of a diamond joined interface brazed according to the present invention.

Detailed observation of a structure of joined portion showed clearly that vanadium carbide 35 is preferably formed in a shape of islands in an interface zone between the brazing-filler material 3 and the diamond 2 as is shown in a model of FIG. 2. The island 35 of vanadium carbide has a diameter of approximately 100 nm and a thickness of approximately 10 nm. A structure was provided in which silver in the silver-copper brazing-filler material precipitated on the islands of vanadium carbides, and copper joined onto the diamond among the islands of vanadium carbides. A cross section of the joined portion probably had a structure as a model shown in FIG. 3.

In a diamond joined interface, vanadium carbides are formed in a shape of islands, thereby the diamond is joined firmly to the brazing-filler material, while the diamond surface is not eroded by the vanadium carbide but an interface having a beautiful view is maintained.

This model will be understood using a degree of plane mismatching introduced in order to discuss influence of added metallic elements over melting point lowering of metal/alloy. This may be obtained by averaging differences of atomic intervals in three dimensions so that a degree of plane mismatching δ may be applied also to substances that have different crystal structures, and the degree of plane mismatching is represented by following equation.

$$\delta = \frac{1}{3} \sum_{i=1}^{3} \frac{|d[uvw]_c^i \cos\theta - d[uvw]_s^i|}{d[uvw]_s^i}$$

In the equation, d[uvw]c represents a nearest interatomic distance in a low index plane of a heterogeneous nucleus (added metal), d[uvw]s represents a nearest interatomic distance in a low index plane of a solid crystal (base metal), and θ represents an angle formed between both the nearest directions of the substances. When a priority solidification of a liquid metal is examined, in the above equation, an interatomic distance of stable site of a compound (vanadium carbide) in a brazing face is adopted for d[uvw]s. This is because a joined surface is set as basis. And a nearest interatomic distance in a low index plane of solidifying metal is adopted for d[uvw]c. Degrees of interface mismatching δ of a variety of substances are shown in TABLE 2. In a combination of vanadium carbide and silver, a degree of interface mismatching δ gives a value of 0.01298, a value between copper and diamond gives 0.01327, and each of these shows small value. Therefore, priority solidification of silver is expectable on vanadium carbide reaction nucleant, and copper solidification is expectable on the diamond. This fact illustrates that a joined interface like a silver mirror having good adhesiveness will be formed on vanadium carbide. On the other hand, a degree of mismatching δ between vanadium carbide and copper shows a large value of 0.13100, and copper probably does not adhere onto vanadium carbide.

TABLE 2

| Solid | Film | Direction | δ |
|---|---|---|---|
| Diamond | Copper | (100) ‖ (100) | 0.01327 |
| Diamond | Silver | (100) ‖ (100) | 0.1271 |
| TiC | Copper | (100) ‖ (100) | 0.1952 |

TABLE 2-continued

| Solid | Film | Direction | δ |
|---|---|---|---|
| TiC | Silver | (100) ∥ (100) | 0.05728 |
| TiC | Silver | (111) ∥ (111) | 0.05418 |
| VC | Silver | (111) ∥ (111) | 0.01298 |
| VC | Copper | (111) ∥ (111) | 0.13100 |

An amount of vanadium added is 0.001 to 5 mass %, preferably not more than 2.0 mass %, and theoretical amount of vanadium is 0.001 mass %. When an amount of vanadium added is in a range of 0.001 to 5 mass %, a diamond can be joined onto a metallic material. However, when an amount of vanadium added exceeds 0.5 mass %, unreacted vanadium may precipitate on a joined interface as small particles. And a reaction product of vanadium carbide is formed in a joined interface between the diamond and the brazing-filler material so much that the joined interface of the diamond gradually increases its roughness. When an amount of vanadium added is in a range of up to 2.0 mass %, there is little scattering of light by the joined interface, but when addition exceeds the value, the joined interface becomes to show black. If vanadium exceeds 2.0 mass %, scattering of light by the joined interface increases and the interface looks black. Therefore, in order to prevent a diamond for ornament from showing black, an amount of vanadium added to a brazing-filler material is 0.001 to 2.0 mass %, and preferably not more than 0.5 mass %. As in a case of tools etc., when esthetic viewpoint is not required, up to 5 mass % of vanadium may be contained.

As mentioned above, vanadium carbides formed in a joined interface of diamond have a shape of islands, and, an area of islands of vanadium carbides in a joined interface is preferably less than 23% of the joined interface area. A ratio exceeding 23% gives a rough joined interface.

An amount of vanadium added to a brazing-filler material can be presumed from following information. First, it may be presumed from following information that supercooling may arise in a silver-copper eutectic brazing-filler material. That is, in an equilibrium system, conditions for constitutional undercooling to arise are given by following equation.

$$\frac{G_L}{V} \leq \frac{m_e C_o (1-k_e)}{k_e D_L}$$

When $m_e$ represents a gradient of liquid phase line and is 4.58K/at %, Co represents a solute concentration (copper concentration is about 39.9 at % in silver-copper eutectic system), $D_L$ represents a diffusion coefficient in liquid phase and is $5 \times 10^{-9} m^2/s$, and $k_e$ represents an equilibrium distribution coefficient and is 0.356, $G_L/V \leq 6.562 \times 10^{10}$. In brazing conditions, $G_L$ is a temperature gradient and V is a solidifying speed. These values are those satisfied in usual brazing conditions in vacuum.

A radius of silver hemisphere (critical radius of nucleus: r*) formed on an island of vanadium carbides is related to an interface turbulence wavelength λ of perturbation of solid-liquid interface. A critical radius of nucleus r* is obtained from $$\frac{\partial G_{homo}}{\partial r} = 0$$

and then $$r^* = \frac{2\sigma_{LS} T_m}{\rho \Delta H \Delta T}$$

In the equations, $G_{homo}$ represents a Gibbs free energy of homogeneous nucleus, r solidification nuclear radius, σLS surface free energy, Tm melting point, ρ density of a solid, ΔH solidification latent heat, and ΔT degree of undercooling. Degree of undercooling was set as 2K based on a measured value for silver in a brazing equipment. From a perturbation model in a joined interface in FIG. 3, it is assumed that a growth of heterogeneous nucleus occurred to $r^*_{Ag}$ by priority solidification of silver. $r^*_{Ag}$ may be estimated as 113.4 nm from ΔH/Tm=11.3/1235 kJ/mol·K, and $\sigma_{LS}=101 \times 10^{-3}$ J/m². A condition in which cell joined interface is produced is given by $$\lambda \geq 4r^*_{Ag}$$

Figure 3:
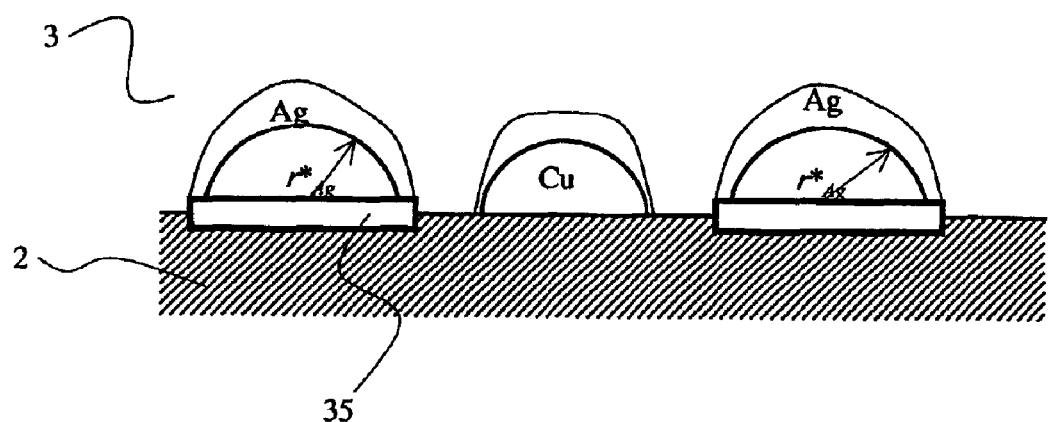
FIG. 3 is a sectional view showing a model of diamond joined interface brazed according to the present invention.

As shown in FIGS. 2 and 3, supposing island-like reaction products 35 which have a radius of $r^*_{Ag}$ are formed, since one island exists in a parallelogram with one side λ, a percentage of reaction product occupied in the joined interface is obtained. A state where less than 23% of the joined interface is covered by the reaction product may be recognized as a state where a sound joined interface is given. It is assumed that one island-like reaction product has a cylindrical form, and if 10 nm determined from actual measurement is used as thickness, an amount of vanadium added will be determined. If a dimension of silver-copper eutectic brazing-filler material is assumed to be 6 mm×6 mm×thickness of 0.1 mm, a theoretical amount of vanadium added to this will be 0.4 microgram, and it means 0.001 mass %.

EXAMPLES

Figure 4:
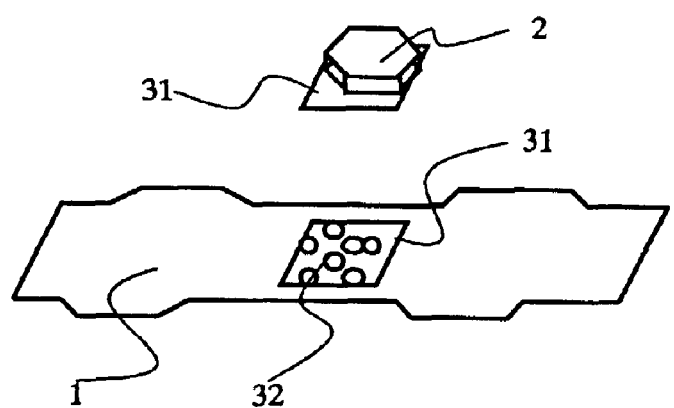
FIG. 4 is an exploded perspective view showing an example of a method by which diamond is brazed according to the present invention.
Figure 5:
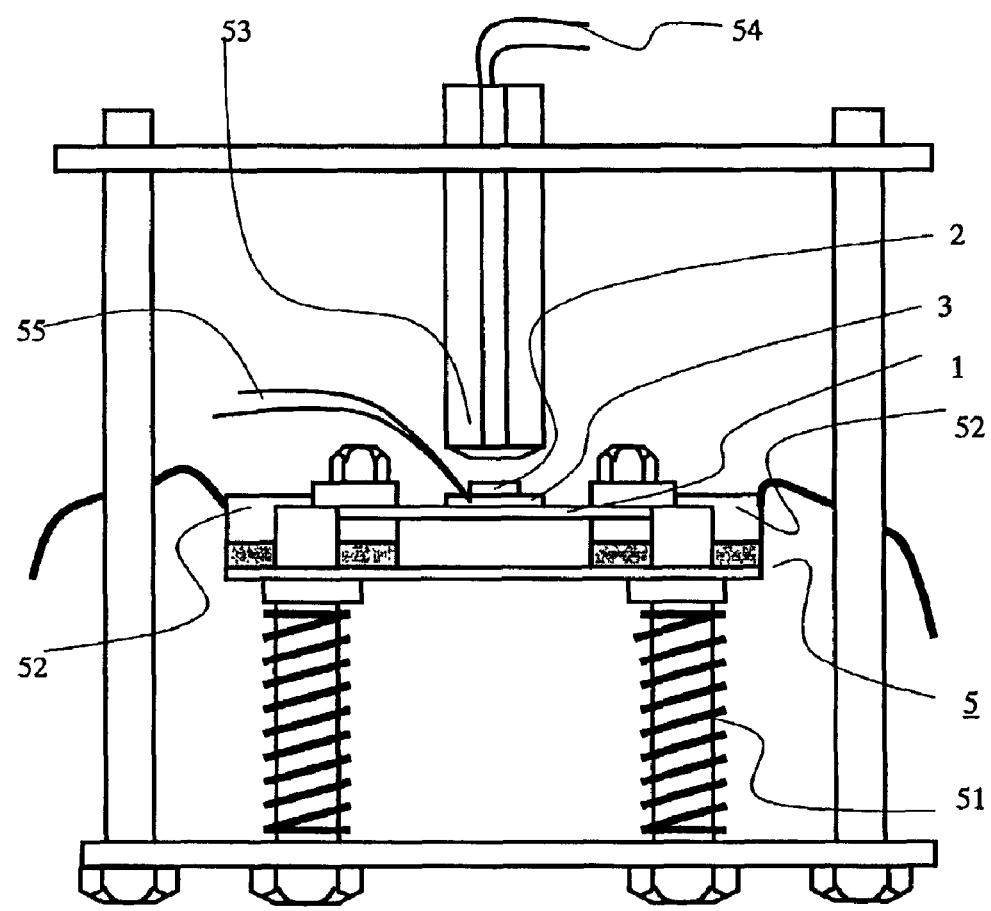
FIG. 5 is a schematic front view of a brazing equipment used for the present invention.

A method for brazing diamonds on a metal substrate using a brazing-filler material of the present invention is shown in FIGS. 4 and 5, as examples. In the examples, 42 Invar alloy substrate (0.2 mm in thickness, 55 mm in length) was used as a metal substrate 1, and an artificial diamond 2 (0.6 mm in thickness) was joined on it. The joined face of the artificial diamond was set as plane (111). As is shown in FIG. 4, two brazing-filler material plates 31 made of silver-copper eutectic alloy that had a dimension of 6 mm×6 mm×thickness of 0.05 mm were used. One of the plates was placed on the 42 Invar alloy substrate, and a required quantity of vanadium hydride powder (VHx) 32 (grain size that passes through 0.075 mm mesh) was further placed on it. Furthermore, the other brazing-filler material plate 31 was arranged on it, and diamonds 2 to be joined were placed thereon.

As an outline front view is shown in FIG. 5, a brazing equipment had a constitution in which both of ends of specimen (metal substrate 1) were fixed with screws in a specimen electrode holder 5 currently supported by springs 51. When voltage was applied between terminals 52 in both ends of the specimen electrode holder 5, the alloy substrate generated heat by current flowing through the 42 Invar alloy substrate. While a load 53 was added toward a lower direction to the diamonds 3 to be joined, the load 53 acted as a copper chiller so that diamond upper surfaces may be cooled. In order to measure temperatures of the copper chiller and the brazing-filler material plate at the time of brazing, thermocouples 54 and 55 were attached to the copper chiller and the brazing-filler material plate, respectively.

Electric current was applied to the 42 Invar alloy substrate and the brazing-filler material was heated up to about 1065K to perform brazing. The temperature was set to a temperature of 10K or more above a melting point of the brazing-filler material (melting point of an eutectic alloy having a composition of silver −39.9 at % copper is about 1052K) so that vanadium hydride decomposed to form an alloy with the brazing-filler material, and that vanadium reacted with carbon to be joined on the surfaces of the diamonds to form reaction products (vanadium carbides). In addition, degree of vacuum at the time of brazing was set to $1 \times 10^{-2}$ Pa. Islands 35 of vanadium carbides were formed in the joined face of the diamonds, as shown in FIGS. 2 and 3, by cooling from a side of the diamonds to carry out unidirectional solidification using a copper chiller at the time of the brazing. Firstly silver solidified on it. On the other hand, it is thought that copper precipitated on the diamonds directly. And then the brazing-filler material alloy precipitated on them to join the diamonds. Although this unidirectional solidification is not necessarily required, unidirectional solidification made formation of the island 35 of vanadium carbide easy.

Vanadium hydride was used here. It is because metal vanadium is active and will react with oxygen rapidly to give oxide in atmospheric condition, while vanadium hydride is stable, and it emits hydrogen easily by heating and resulting vanadium is alloyed with the brazing-filler material.

In a description above, although the silver-copper eutectic brazing-filler material was used, a gold-copper brazing-filler material or a gold-silver-copper brazing-filler material may be used. A constitution having a clad beforehand with vanadium as a powdered vanadium hydride, and a constitution in which metallic vanadium is alloyed in a brazing-filler material may also be used.

Experiment 1

The same method as in the above described Example was repeated, and artificial diamonds were joined on a 42 Invar alloy substrate. A silver-copper eutectic alloy brazing-filler material of the present invention was used here, amount of added vanadium hydride was varied for the amount of vanadium to brazing-filler material to be contained by 0.01, 0.2, 0.5, 1.0, and 2.0 mass %, respectively. Evaluation for joined portions of specimens of the artificial diamonds thus joined was performed. Coloring of the joined portion was checked by macroscopic and microscopic observations, and joined interfaces were shaved off and observed using a non-contacting atomic force microscope (NC-AFM). Results are shown in TABLE 3. As is clear in Table 3, joined portions in which vanadium is contained up to 0.5 mass % showed silver white coloring. When 1.0 mass % of vanadium was contained, it showed silver coloring although small particles were observed. When 2.0 mass % of vanadium was contained, the joined portion showed black coloring. And in observation result of NC-AFM, islands were clearly observed in specimens containing vanadium of 1.0 mass % or less.

TABLE 3

| Specimen number | Amount of V contained | Coloring of brazed surface by macroscopic observation | Formation of VC islands observed by OM (and AFM) |
|---|---|---|---|
| 1 | 0.01 mass % | Silver-white | Observed |
| 2 | 0.2 | Silver-white | Observed |
| 3 | 0.5 | Silver-white | Observed |

TABLE 3-continued

| Specimen number | Amount of V contained | Coloring of brazed surface by macroscopic observation | Formation of VC islands observed by OM (and AFM) |
|---|---|---|---|
| 4 | 1.0 | Silver-white (small particles not completely melted were observed) | Observed (Islands are partially connected) |
| 5 | 2.0 | Black coloring with a diameter of about 2 mm | Observed a little (Partially making a layer) |

*OM: Optical Microscope  AFM: Atomic Force Microscope

The observation result shows that inclusion of vanadium of not more than 0.5 mass % is most preferable. Even if an amount of vanadium contained exceeds 2.0 mass %, although joining is possible, since joined face gives black coloring, it is scarcely suitable for ornamental use. Since vanadium tends to be uniformly distributed in a brazing-filler material when vanadium is added as vanadium hydride, it is desirable to set to 2.0 mass % or less.

Experiment 2

In order to investigate occurrence of defect in joining, a conventional TiCuSil brazing-filler material was used first, and 20 diamonds were joined onto a 42 Invar alloy substrate. A rate of occurrence of defect in joining when crystal planes (100), (110) and (111) of diamond respectively were brazed is shown in TABLE 4. When the plane (110) of the diamond was joined, high percentage defective was obtained, and remarkable percentage defective was obtained also in plane (111).

When the plane (111) of the diamond was joined using a brazing-filler material (vanadium of 0.3 mass % was contained in a silver-copper eutectic alloy) of the present invention, as shown in TABLE 4, defect in joining showed 0%.

TABLE 4

| Brazing-filler material | Joined plane of diamond | Percentage defective in joining |
|---|---|---|
| TiCuSil Brazing-filler material | Plane (100) | 0% |
| | Plane (110) | 43% |
| | Plane (111) | 29% |
| Brazing-filler material of the present invention | Plane (111) | 0% |

In the present invention, a brazing-filler material that contains at least one selected from a group consisting of gold and silver, and copper as main ingredients, and that further contains vanadium is used, and therefore a diamond may be firmly and stably brazed on a metal substrate. Amount of vanadium added may be set as 0.001 to 5 mass %, and when a brazing-filler material contains 0.001 to 2.0 mass % of vanadium, vanadium carbide is formed in a shape of islands in a joined interface of the diamond, and thus further stabilized brazing may be attained. Since the joined surface of the diamond is not eroded when vanadium is not more than 0.5 mass %, a surface with a beautiful view can be maintained.

And when brazing is performed by a method for brazing of the present invention, cooling of the brazing-filler material is performed from a side of the diamond to advance solidification, islands of vanadium carbide are easily formed in the diamond joined interface, and thereby stable brazing is accomplished.

What is claimed is:

1. A method for brazing diamond, comprising the steps of:
   placing on a metal substrate to be joined, a brazing-filler material consisting essentially of vanadium of 0.001 to 2.0 mass % and the balance being principal components consisting of copper and at least one selected from the group consisting of gold and silver,
   placing diamond thereon,
   heating and melting the brazing-filler material, and
   subsequently cooling to solidify the brazing-filler material and to precipitate vanadium carbides in an island shape on a joined interface between the brazing-filler material and the diamond to provide the joined interface with less roughness than that showing black.

2. A method for brazing diamond according to claim 1, wherein a vanadium content is 0.001 to 0.5 mass % in the brazing-filler material.

3. A method for brazing diamond according to claim 2, wherein the brazing-filler material is heated at a temperature 10 K or more above a melting point of a brazing-filler material.

4. A method for brazing according to claim 3, wherein cooling is performed from a side of the diamond to solidify the brazing-filler material after the brazing-filler material is heated and melted.

5. A brazed diamond comprising:
   a metal substrate, and
   a diamond brazed on the metal substrate with a brazing-filler material, between the metal substrate and the diamond, consisting essentially of vanadium of 0.001 to 2.0 mass % and the balance being principal components consisting of copper and at least one selected from the group consisting of gold and silver,
   wherein the brazing-filler material has precipitated vanadium carbides in an island shape on a joined interface between the brazing-filler material and the diamond, and the joined interface has less roughness than that showing black.

6. A brazed diamond according to claim 5, wherein a vanadium content is 0.001 to 0.5 mass % in the brazing-filler material.

7. A brazed diamond according to claim 5, wherein the principal components are in a eutectic composition of copper and at least one of gold and/or silver.

8. A brazed diamond according to claim 5, wherein the precipitated vanadium carbides in an island shape is less than 23% of the joined interface area.

9. A brazed diamond according to claim 6, wherein the principal components are in a eutectic composition of copper and at least one of gold and/or silver.

10. A brazed diamond according to claim 5, wherein the principal components consist of copper and silver.

11. A brazed diamond according to claim 10, wherein a vanadium content is 0.001 to 0.5 mass % in the brazing-filler material.

12. A brazed diamond according to claim 10, wherein the principal components are in a eutectic composition of copper and silver.

13. A brazed diamond according to claim 11, wherein the principal components are in a eutectic composition of copper and silver.

14. A brazed diamond according to claim 5, wherein the principal components consist of copper, silver and gold.

15. A brazed diamond according to claim 14, wherein a vanadium content is 0.001 to 0.5 mass % in the brazing-filler material.

16. A brazed dd according to claim 14, wherein the principal components are in a eutectic composition of copper, silver and gold.

17. A brazed diamond according to claim 15, wherein the principal components are in a eutectic composition of copper, silver and gold.

18. An ornamental brazed diamond comprising:
    a metal substrate, and
    a diamond brazed on the metal substrate with a brazing-filler material, between the metal substrate and the diamond, consisting essentially of vanadium of 0.001 to 2.0 mass % and the balance being principal components consisting of copper and at least one selected from the group consisting of gold and silver,
    wherein the brazing-filler material has precipitated vanadium carbides in an island shape on a joined interface between the brazing-filler material and the diamond, and the joined interface has less roughness than that showing black.

19. An ornamental diamond according to claim 18, wherein a vanadium content is 0.001 to 0.5 mass % in the brazing-filler material.

20. An ornamental diamond according to claim 18, wherein the principal components are in a eutectic composition of copper and at least one of gold and/or silver.

21. An ornamental diamond according to claim 19, wherein the principal components are in a eutectic composition of copper and at least one of gold and/or silver suitable to the ornamental use.

22. A method for brazing diamond, comprising the steps of:
    placing on a metal substrate to be joined a brazing-filler material that contains vanadium of 0.001 to 0.5 mass % and principle components consisting of copper and at least one selected from the group consisting of gold and silver,
    placing diamond thereon,
    heating and melting the brazing-filler material at a temperature 10 K or more above a melting point of the brazing-filler material, and
    subsequently cooling from a side of the diamond to solidify the brazing-filler material.

23. A method for brazing diamond according to claim 22, wherein the step of placing on a metal substrate to be joined a brazing-filler material comprises:
    providing, on the metal substrate, plates composed of copper and at least one selected from the group consisting of gold and silver and
    providing vanadium hydride powder containing vanadium of 0.001 to 0.5 mass % to the whole brazing-filter material between the plates.

24. A brazed diamond comprising:
    a diamond;
    brazing material including 0.001 to 2.0 mass. % vanadium, copper and one of gold and silver, said brazing material being connected to said diamond by precipitated vanadium carbides arranged in island shapes at an interface between said diamond and said brazing material, said interface having a surface roughness displaying a brightness greater than black.

25. A diamond in accordance with claim 24, wherein:
    a substrate is provided, said diamond with said brazing material is arranged on said substrate in an ornamental arrangement;
    said brazing material is arranged on said diamond to have said surface roughness of said interface display a silver white color.

* * * * *